United States Patent [19]

Buckley

[11] Patent Number: 4,970,794
[45] Date of Patent: Nov. 20, 1990

[54] PRISM AND SIGHTING TARGET ASSEMBLY

[75] Inventor: Galen L. Buckley, Dana Point, Calif.

[73] Assignee: Pyramid Optical, Inc., Irvine, Calif.

[21] Appl. No.: 333,997

[22] Filed: Apr. 4, 1989

[51] Int. Cl.$^5$ ............................................. G01C 15/06
[52] U.S. Cl. ..................................... 33/293; 350/102; 350/287
[58] Field of Search ......... 33/293, 296, 299, DIG. 21; 350/102, 107, 287

[56] References Cited

U.S. PATENT DOCUMENTS

| | | | |
|---|---|---|---|
| 1,649,764 | 11/1927 | Wannanaker, Jr. | 33/293 |
| 4,339,880 | 7/1982 | Hall | 33/293 |
| 4,343,550 | 8/1982 | Buckley et al. | 33/293 |
| 4,519,674 | 5/1985 | Buckley et al. | 33/293 |
| 4,803,784 | 2/1989 | Miller | 33/293 |

FOREIGN PATENT DOCUMENTS 2354935  5/1975  Fed. Rep. of Germany ...... 350/102

Primary Examiner—William A. Cuchlinski, Jr.
Assistant Examiner—D. Price
Attorney, Agent, or Firm—Leonard Tachner

[57] ABSTRACT

An improved combination of prism assembly and sighting target in a novel structure in which the sighting target provides a dual function by acting as the structural support for the prism assembly in addition to its usual function of providing a readily observable target from long distances. More specifically, the present invention provides, in a preferred embodiment, a diamond shaped sighting target, the center of which is provided with an aperture for receiving the prism assembly housing which extends therethrough in a direction normal to the plane of the sighting target. The prism housing is secured to the sighting target by means of a bracket into which the prism assembly is threaded, the bracket being secured to the sighting target.

4 Claims, 2 Drawing Sheets

PRISM AND SIGHTING TARGET ASSEMBLY

BACKGROUND OF THE INVENTION

1. Field of the Invention

The present invention relates generally to prism and target assemblies such as those employed in surveying, civil engineering and the like for use in measuring distances and more specifically to an improved combined sighting target and prism assembly in which a relatively large target serves the dual function of visual target and structural support for the prism housing.

2. Prior Art

Retro-reflective prism assemblies for use in surveying and civil engineering in conjunction with laser range finding instrumentation for measuring distances is well-known in the art. In addition, the use of targets in close proximity to such retro-reflective prism assemblies for enabling easy sighting of the prism assembly from a long distance for alignment of the laser optics and the prism assembly, is also well-known in the art. In more recent years there has been a commercialization of small prism assemblies for use at shorter distances such as up to one thousand yards. Typically, such smaller prism assemblies have a diameter of approximately 1½ inches as compared to more conventional prism assemblies having diameters of approximately 3 inches. This reduction in the size of prism assemblies for use at smaller distances has greatly enhanced the convenience of distance measurement in the field by providing pocket size prism assemblies which may be more conveniently carried and more conveniently utilized. One disadvantage however of such a decrease in the size of the retro-reflective prism assembly components is that in order to connect the prism assembly to a suitable sighting target in a conventional manner, it has been necessary to also reduce the size of the sighting target. This latter size reduction makes it more difficult for the initial alignment of the laser optics and the prism assembly and tends to generally defeat the function of the sighting target.

There is therefore a need for providing a sighting target for a smaller retro-reflective prism assembly which permits the user to exploit the advantages of smaller prism assembly components, but without requiring a commensurate decrease in the size of the sighting target which would otherwise tend to defeat the sighting target function which is to provide a readily observable target with which to align the optics of the system for distance measurement.

SUMMARY OF THE INVENTION

The aforementioned need is satisfied by the present invention which provides an improved combination of prism assembly and sighting target in a novel structure in which the sighting target provides a dual function by acting as the structural support for the prism assembly in addition to its usual function of providing a readily observable target from long distances. This novel structure is particularly advantageous for use in conjunction with relatively small prisms. It permits the use of targets which are still relatively large compared to the prism in a relatively simple structure. It does so without reducing the convenience gained from the smaller components of the prism assembly and without reducing the convenience of having a readily observable target from long distances. More specifically, the present invention provides, in a preferred embodiment, a diamond shaped sighting target, the center of which is provided with an aperture for receiving the prism assembly housing which extends therethrough in a direction normal to the plane of the sighting target. The prism housing is secured to the sighting target by means of a bracket into which the prism assembly is threaded, the bracket being secured to the sighting target in a manner to be described hereinafter in more detail.

OBJECTS OF THE INVENTION

It is therefore a principal object of the present invention to provide an improved combination of prism assembly and sighting target for use in surveying and civil engineering and the like for measuring distances between the prism assembly and distance measuring instrumentation such as laser optics, the improvement comprising a sighting target structure serving dual purposes, one of whcih is the inherent sighting target function and the other of which is the unique additional function of structurally supporting the prism assembly.

It is an additional object of the present invention to provide a combined prism assembly and sighting target wherein the sighting target provides the structural support for the prism assembly.

It is still an additional object of the present invention to provide an improved target and prism assembly combination wherein the visual surface area of the sighting target is at least twenty times the reflecting surface area of the prism.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings is which.

DETAILED DESCRIPTION OF A PREFERRED EMBODIMENT

Figure 1:
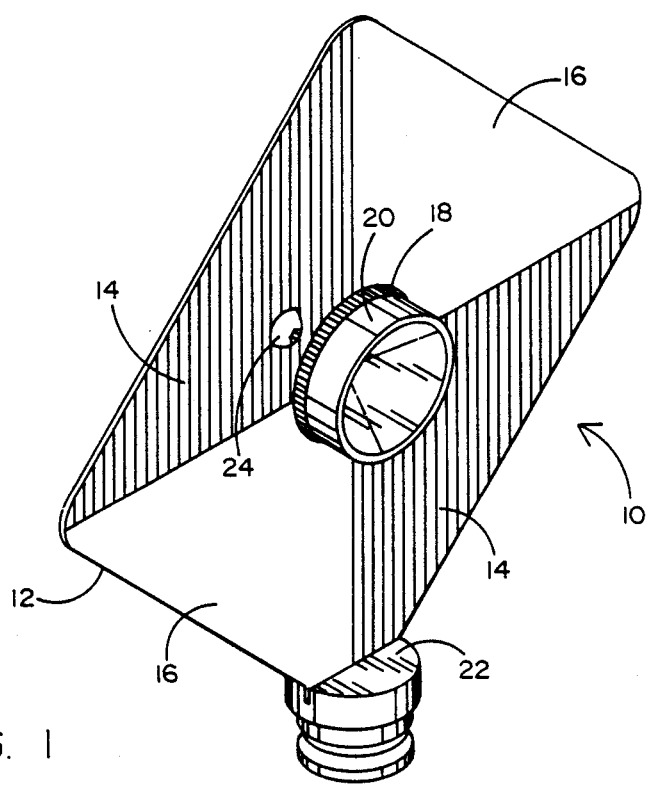
FIG. 1 is an isometric view of the front of the target and prism assembly combination of the present invention.

Referring now to the figures, namely FIGS. 1-4, it will be seen that the prism assembly/target 10 of the present invention comprises a target 12 having a plurality of distinctly defined sections such as for example, dark colored quadrants 14 and light colored quadrants 16. Other target indicia which define a target center point would also be suitable. The center of the target is provided with an aperture 18 adapted for receiving a prism housing 20 therethrough. The lower tip of the target 12 is provided with a threaded interface 22 to permit mounting the target on a suitable support structure such as a tripod or the like.

Figure 2:
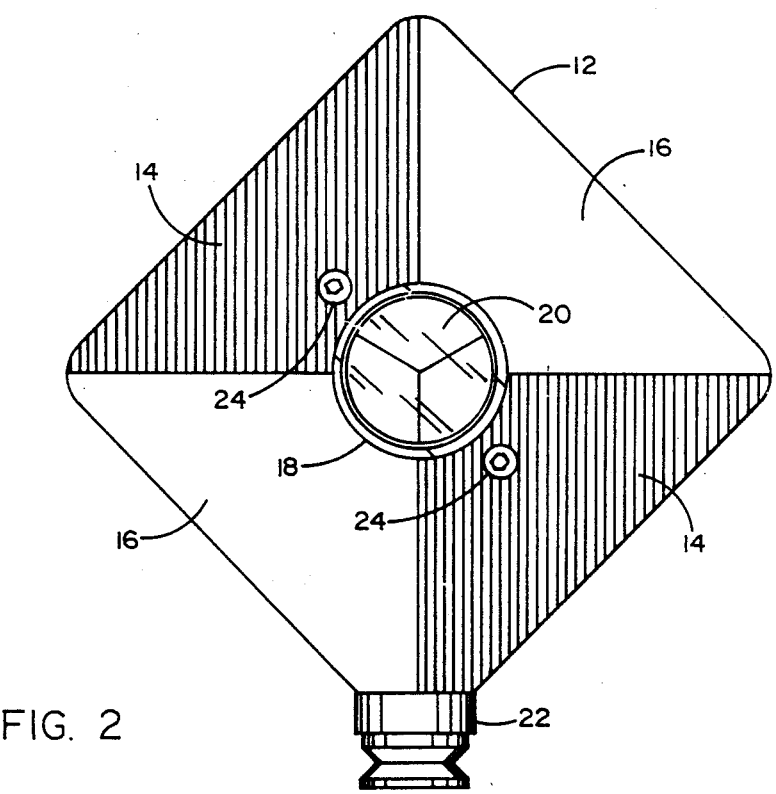
FIG. 2 is a plan view of the front of the present invention.
Figure 3:
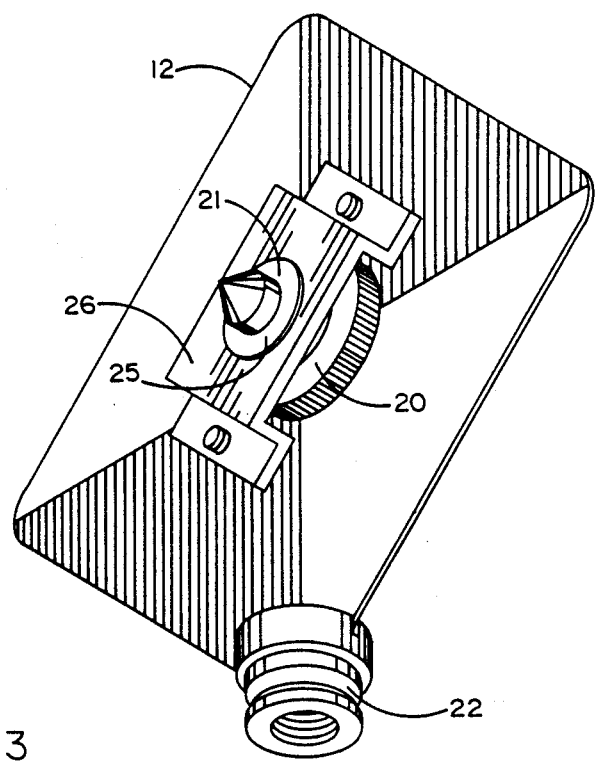
FIG. 3 is an isometric view of the rear portion of the present invention.
Figure 4:
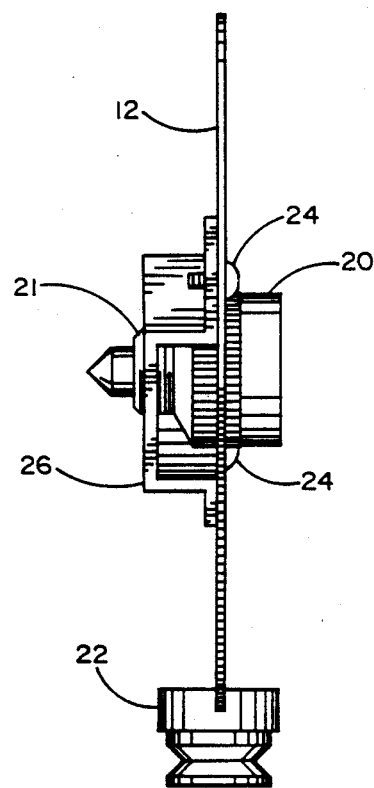
FIG. 4 is a side view of the present invention.

As seen best is FIGS. 3 and 4, one side of the target 12 is provided with a bracket 26 which is secured to the target by a pair of fasteners 24 and which provides a threaded aperture 25 for receiving a threaded portion 21 of the prism housing 20. In the preferred embodiment of the invention illustrated in the accompanying drawings, bracket 26 is oriented diagonally with respect to the target 12 so that the fasteners 24 extend through the target 12 on the darkened quadrants 14. The heads of the fasteners 24, which are visible on the surface of the target opposite the bracket 26 and are seen in FIGS. 1 and 2, may be also darkened the same color as the quadrants 14. In this manner, the fasteners 24 are relatively invisible from a distance and do not obscure the sighting target designs provided by the respective quadrants 14 and 16.

It will be observed that the sighting target of the present invention serves two distinct purposes. The first such purpose is that of providing a higly visible sighting target, the center of which coincides with the center of the prism assembly thereby enabling relatively easy and convenient sighting of the prism assembly from long distances for reducing the time and effort required to align the laser optical source with the prism assembly of the present invention. However, an additional purpose, which is believed to be unique to the present invention, is that of structurally supporting the prism assembly in a position relative to the threaded interface thereby obviating any requirement for other support structure normally required in the prior art prism assembly structures. A highly significant feature of the present invention resulting from its novel structure is that despite the fact the prism itself may be relatively small (i.e. a diameter of 1½ inches) the sighting target may be relatively large and, in fact, even larger than conventional sighting targets provided with larger prism assemblies. In a preferred embodiment of the present invention, the visible surface area of the sighting target is more than twenty times the reflecting surface area of the prism. This larger ratio assures that the user of the distance measuring instrumentation with which the present invention may be utilized, can readily observe the sighting target even over the largest distances.

It will now be understood that what has been disclosed herein comprises a novel prism assembly and target combination wherein the target provides two distinct functions including a normal function for sighting target which permits distant observers to readily detect the prism assembly which might otherwise be difficult to detect because of its relatively small size. An additional and novel function is that of providing structural support for the prism assembly thereby obviating any requirement for additional structure as is normally provided in prior art prism assemblies. In addition, because of the unique manner in which the sighting target and prism assembly of the present invention are interfaced, there is virtually no upper limit on the surface area of the sighting target other than the convenience of conveying the sighting target. Consequently, the ratio of surface area of the sighting target and of the prism may be relatively high and in one preferred embodiment of the invention disclosed herein, that ratio is at least 20.

Those having skill in the art to which the present invention pertains, will now, as a result of the applicant's teaching herein perceive various modifications and additions which may be made to the invention. By way of example, although a diamond shaped sighting target has been disclosed herein, it will be understood that sighting targets of distinctly different shapes may also be provided without materially altering the interface between the sighting target and the prism housing. Furthermore, it will be understood that while a specific bracket configuration has been disclosed herein for securing the prism housing to the target, brackets of other configuration may also be used to achieve the desired structural interface between a relatively small prism housing and a relatively large sighting target. Accordingly, all such modifications and additions are deemed to be within the scope of the invention which is to be limited only by the claims appended hereto.

I claim:

1. A combined prism assembly and sighting target apparatus for use in conjunction with instrumentation for measuring distances in surveying and the like; the apparatus comprising:
    a sighting target having targeting indicia defining a center point and having an aperture through said center point for receiving a prism housing therethrough, said target also having means for connection to a tripod;
    a prism housing having a reflecting prism and extending through said target aperture;
    means for securing said prism housing to said sighting target; and
    wherein said visible surface area of said sighting target is at least twenty times larger than the reflecting surface area of said prism.

2. The apparatus recited in claim 1 wherein said prism housing comprises a threaded portion and wherein said securing means comprises a bracket having a mating threaded aperture for receiving said threaded portion of said housing and at least one fastening device for fastening said bracket to said target.

3. A combined prism assembly and sighting targe apparatus for use in surveying and the like; the apparatus comprising:
    a sighting target having means for attachment to a tripod;
    a prism housing having a retro-reflective prism;
    means securing the prism housing to the sighting target; and
    wherein the visible surface area of said sighting target is at least twenty times larger than the reflecting surface area of said prism.

4. The apparatus recited in claim 3 wherein said securing means comprises an aperture in said sighting target and a bracket receiving said prism housing through said aperture, said bracket being affixed to said target.

* * * * *